April 17, 1951     D. W. MOORE, JR., ET AL     2,549,622
PNEUMATIC TEMPERATURE-RESPONSIVE APPARATUS
Filed Jan. 24, 1947
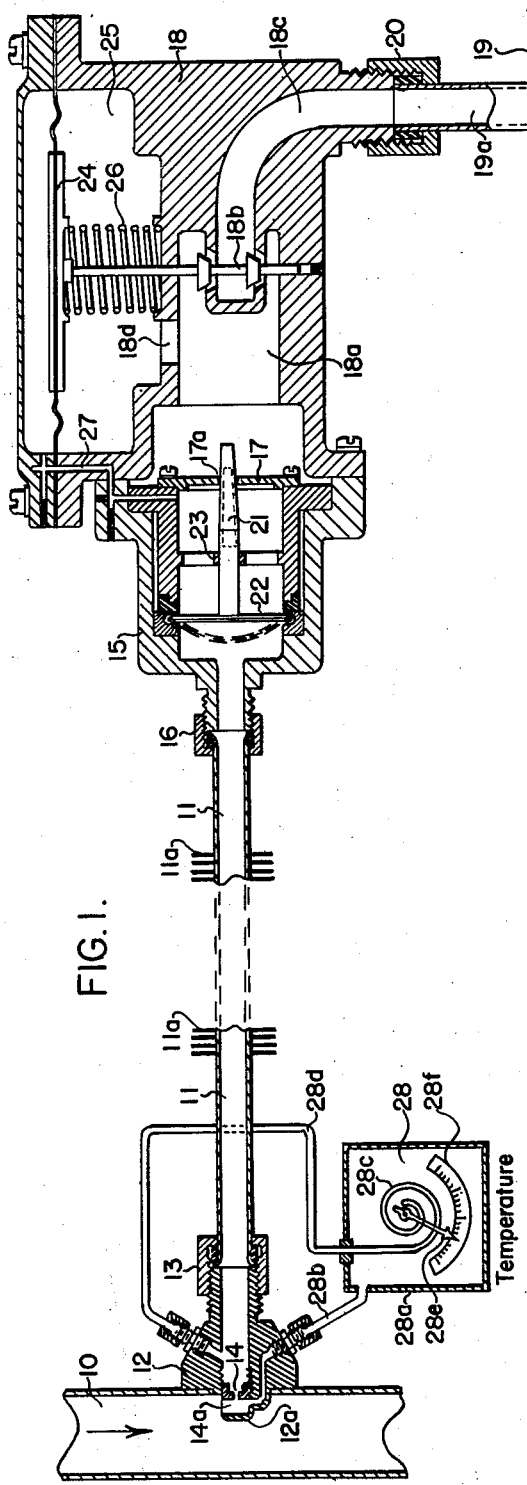
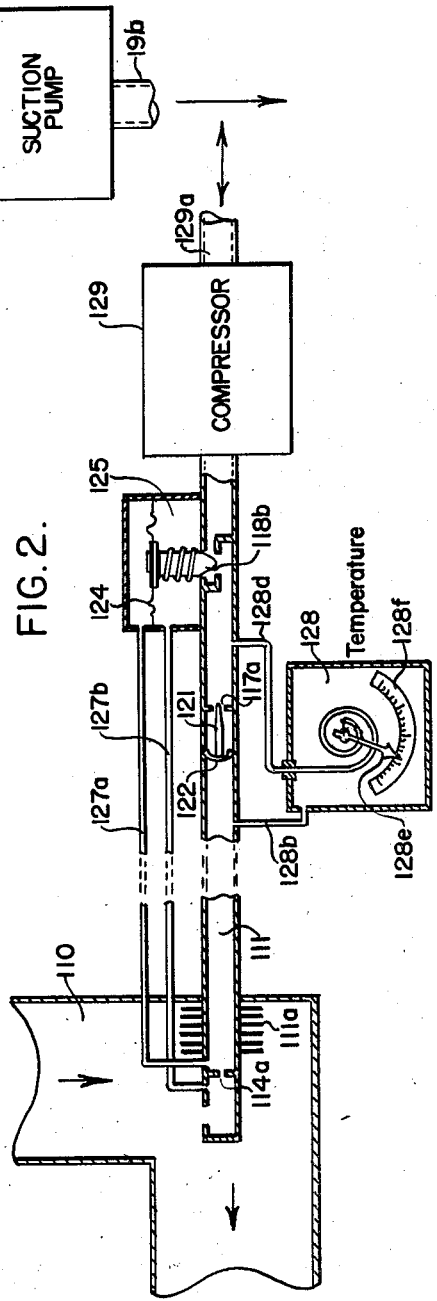
INVENTORS
DAVID W. MOORE, Jr.
ALFRED G. NASH
BY
*Laurence B. Dodds*

Patented Apr. 17, 1951

2,549,622

UNITED STATES PATENT OFFICE 2,549,622

PNEUMATIC TEMPERATURE-RESPONSIVE APPARATUS

David W. Moore, Jr., New York, and Alfred G. Nash, Garden City, N. Y., assignors to Fairchild Camera and Instrument Corporation, a corporation of Delaware Application January 24, 1947, Serial No. 724,142

13 Claims. (Cl. 73—357)

This invention relates to pneumatic temperature-responsive apparatus and, while it is of general application, it is particularly adapted to the measurement of temperature of an elastic fluid at a temperature so high that ordinary temperature measuring apparatus is inapplicable, as, for example, to the measurement of the temperature of combustion gases in an internal combustion gas turbine.

In the copending application Serial No. 604,867, filed July 13, 1945, of David W. Moore, Jr., entitled "Elastic-Fluid Temperature-Responsive System" assigned to the same assignee as the present application, there is described and claimed a pneumatic temperature-responsive apparatus utilizing the basic principles of Boyle's law combined with Gay-Lussac's or Charles' law, namely, that for any given mass of perfect gas the following equation is satisfied under all conditions of temperature, volume, and pressure:

$$PV = RT \qquad (1)$$

where

P=absolute pressure of the gas
V=volume of the gas
T=temperature of the gas
R=the gas constant In the system of that application, a quantity of high-temperature elastic fluid is extracted from its container, cooled, and its mass flow measured, regulated, or otherwise determined and it is shown that the volumetric flow of the hot gas through a metering orifice, as determined by the differential pressure across such orifice, is representative of a temperature factor of the hot fluid. If the high-side orifice pressure is maintained constant, such differential pressure is representative of the actual temperature of the fluid on a properly calibrated scale.

The present invention constitutes an improvement on the temperature-responsive apparatus of aforesaid co-pending application and comprises essentially a simplification of the apparatus for determining the fluid mass flow of the extracted fluid. This simplified apparatus utilizes direct-acting condition-responsive elements in lieu of the electrical servo mechanisms of aforesaid copending application.

The present invention also comprises certain modifications of the apparatus of the aforesaid application to adapt it for application to high-temperature low-pressure elastic fluids at static pressures insufficient to maintain adequate differential pressures across the metering and controlling constrictions of the apparatus.

It is an object of the present invention, therefore, to provide a new and improved pneumatic temperature-responsive apparatus of simple, economical, and rugged construction.

It is another object of the invention to provide a new and improved pneumatic temperature-responsive apparatus in which the controlling or regulating operations are effected by direct-acting mechanisms responsive to the several conditions, thus avoiding the necessity of auxiliary servo mechanisms.

It is another object of the invention to provide a new and improved pneumatic temperature-responsive apparatus which is suitable for response to high-temperature elastic fluids at static pressures insufficient to maintain adequate differential pressures across the metering and controlling constrictions.

In accordance with the invention, there is provided a pneumatic apparatus responsive to a temperature factor of an elastic fluid in a container comprising a conduit adapted for fluid connection with the container, a metering constriction in the conduit, and a controlling constriction in the conduit. The apparatus also includes heat-exchanging means between the constrictions for modifying the temperature of the fluid, a valve in the conduit, and a differential pressure-responsive means connected across the controlling constriction and connected directly to the valve to maintain the differential pressure across the controlling constriction substantially constant. The apparatus further includes means responsive to the differential fluid pressure across the metering constriction for deriving an effect representative of a temperature factor of the contained fluid. In a specific form of the invention, one of the constrictions is a high-temperature constriction in the vicinity of the container and the other a low-temperature constriction remote from the container and the apparatus includes means for compensating the area of the low-temperature constriction in accordance with variations in the temperature of the fluid at such constriction.

Further in accordance with the invention, there is provided a pneumatic temperature-responsive apparatus of the type described, comprising a metering constriction in the fluid conduit, a controlling constriction in the conduit, means for inducing a flow of elastic fluid through the conduit to maintain substantial differential pressures across such constrictions, heat-exchanging means between the constrictions for modifying the temperature of the fluid, and means responsive to the differential pressure across the controlling constriction for determining the fluid mass flow through the conduit. The apparatus also includes means responsive to the differential fluid pressure across the metering constriction for deriving an effect representative of a temperature factor of the contained fluid.

For a better understanding of the present invention, together with other and further objects thereof, reference is had to the following description taken in connection with the accompanying drawing, and its scope will be pointed out in the appended claims.

Referring to the drawing, Fig. 1 is an illustration, partially schematic, of a pneumatic temperature-responsive apparatus embodying the invention for measuring the temperature of a high-temperature gas under low pressure, while Fig. 2 is a modified form of temperature-responsive apparatus also for measuring the temperature of a high-temperature, low-pressure elastic fluid in a container.

Referring now to Fig. 1 of the drawing, there is represented a pneumatic apparatus responsive to a temperature factor of a high-temperature elastic fluid in a container 10, which may be a conduit, combustion chamber, or any other type of container. The apparatus includes a conduit 11 adapted for fluid connection with the container 10, as by means of a fitting 12 secured to the container 10 and a packing gland or nut 13. An orifice plate 14 having a high-temperature metering constriction or orifice 14a is disposed in the conduit 11 or in the fitting 12 which forms an extension thereof and, as illustrated, is in the vicinity of the container 10, specifically at the entrance of the conduit 11 at the container 10. As illustrated, the fitting 12 has a scoop-like extension 12a protruding into the conduit 10 to develop at orifice 14a a pressure which approximates the sum of the static and kinetic pressures of the gas and thus is representative of its total energy content. At the other end of the conduit 11 is disposed a fixture 15 secured to the conduit 11 by a packing nut or gland 16. The fixture 15 is of a generally cup-shaped configuration and includes a low-temperature controlling constriction or orifice 17a formed in an orifice plate 17 secured across the open mouth of the cup-shaped fixture 15.

As indicated by dotted lines, the conduit 11 is preferably of considerable length so that the low-temperature orifice 17a is remote from the container 10. If the conduit 11 is of sufficient length, it serves as a heat-exchanging means between the constrictions 14a and 17a for modifying the temperature of the fluid in its flow through the conduit; it is preferably designed to act as a cooling means for reducing the temperature of the high-temperature fluid from the container 10 to a substantially constant value corresponding to the ambient temperature. In certain installations it may be desirable to add cooling fins 11a to the conduit 11 to aid in this function.

Attached to the fixture 15 is a valve housing 18 having a fluid channel 18a communicating with the orifice 17a and provided with a valve 18b disposed therein and communicating with an outlet channel 18c. In case the static pressure of elastic fluid in the container 10 is sufficient to induce a flow through the conduit 11 such as to maintain substantial differential pressures across the orifices 14a and 17a, the outlet 18c of the valve 18 may exhaust directly into the air. However, when the static pressure of the fluid in the container 10 is relatively low, there may be provided additional means for extracting fluid from the container 10 through the conduit 11 so as to maintain substantial differential pressures across the orifices 14a and 17a of an aggregate value exceeding the static pressure in the container 10. This means may be in the form of a suction pump 19 having an inlet pipe 19a connected to the outlet channel 18c of of the valve 18 by means of a packing nut or gland 20, and having an outlet 19b connecting directly with the atmosphere.

The temperature-responsive apparatus of Fig. 1 further includes means responsive to the differential pressure across the controlling constriction or orifice 17a for determining the fluid mass flow through the conduit 11. If the temperature at the orifice 17a varies substantially, this means includes means for compensating the area of the low-temperature constriction 17a in accordance with variations in the temperature of the fluid at that point. This compensating means may be in the form of an adjustable tapered plug 21 extending through the orifice 17a and a thermal element, such as a bi-metallic strip 22, connected to one end of the plug 21 and firmly secured in the fixture 15 to adjust the plug 21 in accordance with variations in temperature. The plug 21 may be disposed to slide through the central bore of a spider 23 to maintain it accurately in alignment with the aperture 17a. The configuration of the tapered plug 21 should be so related to the thermal characteristics of the bi-metallic strip 22 as to maintain substantially constant the ratio of the temperature at the orifice 17a to the square of the effective area of such orifice.

The mass-flow determining means also includes a differential pressure-responsive means connected across the low-temperature constriction 17a and connected directly to the valve 18b to maintain the differential pressure across the low-temperature orifice 17a substantially constant. This means may be in the form of a differential-pressure diaphragm 24 mounted in a generally cylindrical chamber 25 in the valve housing 18 and suitably biased by a spring 26. The lower side of the diaphragm 24 is exposed to the low-side pressure at the orifice 17a through an opening 18d between the chamber 18a and the chamber 25. The upper face of the diaphragm 24 is exposed to the pressure at the high-pressure side of orifice 17a through a conduit 27 communicating with the central chamber of the fixture 15. As illustrated, the conduit 27 is formed by a series of communicating bores with their open ends suitably plugged.

The temperature-responsive apparatus further includes means responsive to the differential pressure across the high-temperature orifice 14a for deriving an effect representative of a temperature factor of the contained fluid. This means is illustrated in the form of a differential-pressure gauge 28 comprising a casing 28a connected to the high-pressure side of the orifice 14a by means of a conduit 28b and enclosing a Bourdon tube 28c connected to the low-pressure side of the orifice 14a by way of a conduit 28d. The pressure gauge 28 includes a pointer 28e attached to the element 28c and co-operating with a scale 28f calibrated to indicate directly in temperature.

The operation of the temperature-responsive apparatus of Fig. 1 may be best understood by considering certain fundamental relationships.

It can be shown by fundamental thermodynamic relations that:

$$T_1 = CT_2\left(\frac{A_1}{A_2}\right)^2 \times \frac{P_1-P_2}{P_2-P_3} \qquad (2)$$

where
$$(P_1-P_2) \ll P_1$$
and
$$(P_2-P_3) \ll P_2$$
and $T_1$ = temperature at orifice 14a
$T_2$ = temperature at orifice 17a
$A_1$ = area of orifice 14a
$A_2$ = area of orifice 17a
$P_1-P_2$ = differential pressure across orifice 14a
$P_2-P_3$ = differential pressure across orifice 17a
C = constant, including the gas constant R of the elastic fluid and orifice constants of the orifices 14a and 17a.

If $P_2-P_3$ is maintained constant, as explained hereinafter, the area $A_1$ of orifice 14a made constant by construction, and the ratio $$\frac{T_2}{A_2^2}$$

is maintained constant by the bi-metallic strip 22, then Equation 2 becomes $$T_1 = K(P_1-P_2) \qquad (3)$$

Returning to the temperature-responsive apparatus of Fig. 1, it is seen that the high-temperature gas flowing through the orifice 14a develops a differential pressure thereacross which is applied to the pressure gauge 28 to develop an indication or effect representative of a temperature factor of the contained fluid. The fluid, in the course of its flow through the conduit 11, is cooled substantially to ambient temperature and passed through the orifice 17a in the fixture 15. If the cooling effectiveness of the conduit 11, either with or without the addition of cooling fins, is sufficient, it may be possible to omit the bi-metallic strip 22 and the associated compensating plug 21 for the orifice 17a. However, for more precise results, these elements are preferably included and the configuration of the plug 21 is so related to the deflection characteristic of the bi-metallic strip 22 as to maintain the ratio $$\frac{T_2}{A_2^2}$$

constant. With this relationship the fluid mass flow through the orifice 17a varies only with the differential pressure across the orifice 17a. However, the differential-pressure diaphragm 24 responsive to the differential fluid pressure across the orifice 17a is effective to regulate or control the valve 18b to maintain the differential pressure across the orifice 17a substantially constant. Under these conditions, the fluid mass flow through the system is also maintained substantially constant and the relationships of Equations 2 and 3 above are satisfied. Under these conditions, the pressure gauge 28, with a suitably calibrated scale 28f, will indicate directly the temperature of the fluid in the container 10.

As stated above, if the pressure of the fluid in the container 10 is insufficient to maintain an adequate differential pressure across the orifices 14a and 17a to permit accurate measurement, this differential pressure may be increased by operation of the suction pump 19 connected to the outlet of the system. Clearly this suction pump may be of any of the several types well known in the art, a water aspirator type being suitable for this purpose. Such a pump is then effective to maintain the aggregate value of the differential pressures across the orifices 14a and 17a substantially greater than the static pressure of the fluid within the container 10.

In Fig. 2 is represented schematically a modification of the system of Fig. 1, in which corresponding elements are given the same reference numerals with an added 100. In this embodiment, the differential pressure element comprising the chamber 125 and the diaphragm 124 are connected by means of conduits 127a and 127b across the high-temperature orifice 114a and the diaphragm 124 is connected directly to the valve 118b in the outlet of the conduit 111. In this instance, the conduit 111 extends an appreciable distance into the container 110 so that the high-temperature orifice 114a is well within the container 110 and there is provided heat-exchanging means, such as the fins 111a, connected to the conduit 111 within the container 110 for purposes hereinafter described.

Further, in the apparatus of Fig. 2 the differential pressure gauge 128 for developing a temperature-representative effect is connected across the low-temperature orifice 117a. In case the static pressure of the fluid in the container 110 is sufficient to maintain substantial differential pressures across the orifices 114a and 117a, the cooling fins 111a may be omitted and the conduit 111 beyond the valve 118b arranged to discharge directly into the air. Alternatively, if the static pressure in the container 110 is inadequate for this purpose, heat-exchanging means such as the fins 111a are provided and there is further provided means for forcing air through the conduit 111 into the container 110 in an amount adequate to maintain substantial differential pressures across the constrictions or orifices. This means may be in the form of a compressor 129, the outlet of which is connected directly to the conduit 111 and the inlet 129a of which may be connected directly to the atmosphere.

Consider first the operation of the temperature-responsive apparatus of Fig. 2 with the omission of the cooling fins 111a and the compressor 129 and with a static pressure in the container 110 sufficient to maintain substantial differential pressures across the orifices 114a and 117a. Under these conditions, the flow of fluid through the conduit 111 is from the container 110 to the atmosphere and the relationships of Equation 2 above are applicable. Since, as in the apparatus of Fig. 1, the area $A_1$ of the high-temperature orifice 114a is maintained constant by construction, the differential pressure $P_1-P_2$ is held constant by the differential pressure regulator 124, 125, and the factor $$\frac{T_2}{A_2^2}$$

is maintained constant by the compensating plug 121 and bi-metallic strip 122, Equation 2 becomes:

$$T_1 = \frac{K}{P_2-P_3} \qquad (4)$$

The operation of the apparatus of Fig. 2 with the conditions as assumed is fundamentally similar to that of Fig. 1 explained above, except that in this instance the high temperature $T_1$ varies inversely with the differential pressure $P_2-P_3$ across the low-temperature orifice 117a. However, by a proper calibration of the scale 128f of the pressure gauge 128, that gauge may be made to indicate directly the temperature of the gas in the container 110.

With the compressor 129 connected and in operation and with the heat exchanger comprising the fins 111a in effect, the flow of elastic fluid, specifically air, through the conduit 111 is reversed and, since the fluid mass flow through the orifices 114a and 117a is the same, it can be shown from fundamental thermodynamic relations that:

$$M = C_1 A_1 \sqrt{\frac{(P_3 - P_2)P_2}{T_2}} = C_2 A_2 \sqrt{\frac{(P_2 - P_1)P_1}{T_1}} \quad (5)$$

where the several terms represent the same parameters as those of Equation 2. This equation may be reduced to:

$$T_1 = \frac{(A_2)^2 (P_2 - P_1) P_1 T_2}{(A_1)^2 (P_3 - P_2) P_2} \quad (6)$$

Again, since the several terms of Equation 6 are maintained constant, except $T_1$ and the differential pressure $P_2 - P_1$, Equation 6 resolves to:

$$T_1 = K(P_2 - P_1) \quad (7)$$

The operation of the apparatus of Fig. 2 with the addition of the heat-exchanging fins 111a and the compressor 129 is essentially similar to that described above, except for the reversal of the direction of flow of fluid through the conduit 111. In accordance with Equation 7 the temperature of the fluid in container 110 varies directly with the differential pressure $P_2 - P_1$ across the low-temperature orifice 117a so that, by a proper calibration of the scale 128f, the gauge 128 may indicate temperature directly.

The temperature-responsive apparatus of both Figs. 1 and 2 with the addition of the suction pump 19 and the compressor 129, respectively, are particularly applicable to the measurement of high temperatures of combustion gases in low-pressure apparatus, such as industrial furnaces, the tail cones of jet engines, and other installations where the static pressure is insufficient to maintain adequate differential pressures across the metering and controlling orifices for accurate measurement.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A pneumatic apparatus responsive to a temperature factor of an elastic fluid in a container comprising, a conduit adapted for fluid connection with the container, a metering first constriction in said conduit, a controlling second constriction in said conduit, heat-exchanging means between said constrictions for modifying the temperature of said fluid, a valve in said conduit, differential-pressure-responsive means connected across said second constriction and connected directly to said valve to maintain the differential pressure across said second constriction substantially constant, and means responsive to the differential fluid pressure across said first constriction for deriving an effect representative of a temperature factor of the contained fluid.

2. A pneumatic apparatus responsive to a temperature factor of an elastic fluid in a container comprising, a conduit adapted for fluid connection with the container, a metering first orifice in said conduit, a controlling second orifice in said conduit, heat-exchanging means between said orifices for modifying the temperature of said fluid, a valve in said conduit, differential-pressure-responsive means connected across said second orifice and connected directly to said valve to maintain the differential pressure across said second orifice substantially constant, and means responsive to the differential fluid pressure across said first orifice for deriving an effect representative of a temperature factor of the contained fluid.

3. A pneumatic apparatus responsive to a temperature factor of a high-temperature elastic fluid in a container comprising, a conduit adapted for fluid connection with the container, a metering first constriction in said conduit, a controlling second constriction in said conduit, cooling means between said constrictions for reducing the temperature of said fluid, a valve in said conduit, differential-pressure-responsive means connected across said second constriction and connected directly to said valve to maintain the differential pressure across said second constriction substantially constant, and means responsive to the differential fluid pressure across said first constriction for deriving an effect representative of a temperature factor of the contained fluid.

4. A pneumatic apparatus responsive to a temperature factor of a high-temperature elastic fluid in a container comprising, a conduit adapted for fluid connection with the container, a high-temperature constriction in said conduit in the vicinity of the container, a low-temperature constriction in said conduit remote from the container, cooling means between said constrictions for reducing the temperature of said fluid, a valve in said conduit, differential-pressure-responsive means connected across one of said constrictions and connected directly to said valve to maintain the differential pressure across said one of said constrictions substantially constant, and means responsive to the differential fluid pressure across the other of said constrictions for deriving an effect representative of a temperature factor of the contained fluid.

5. A pneumatic apparatus responsive to a temperature factor of a high-temperature elastic fluid in a container comprising, a conduit adapted for fluid connection with the container, a metering first constriction in said conduit, a controlling second constriction in said conduit, cooling means between said constrictions for reducing the temperature of said fluid to a substantially constant value, a valve in said conduit, differential-pressure-responsive means connected across said second constriction and connected directly to said valve to maintain the differential pressure across said second constriction substantially constant, and means responsive to the differential fluid pressure across said first constriction for deriving an effect representative of a temperature factor of the contained fluid.

6. A pneumatic apparatus responsive to a temperature factor of a high-temperature elastic fluid in a container comprising, a conduit adapted for fluid connection with the container, a high-temperature constriction in said conduit in the vicinity of the container, a low-temperature constriction in said conduit remote from the container, cooling means between said constrictions for reducing the temperature of said fluid, means responsive to the fluid temperature at said low-temperature constriction for compensating the area thereof in accordance with variations in temperature of the fluid thereat, a valve in said conduit, differential-pressure-responsive means connected across one of said constrictions and connected directly to said valve to maintain the differential pressure across said one of said constrictions substantially constant, and means responsive to the differential fluid pressure across the other of said constrictions for deriving an effect representative of a temperature factor of the contained fluid.

7. A pneumatic apparatus responsive to a temperature factor of a high-temperature elastic fluid in a container comprising, a conduit adapted for fluid connection with the container, a high-temperature constriction in said conduit adjacent the end thereof adapted for connection to the container, a low-temperature constriction in said conduit remote from said high-temperature constriction, cooling means between said constrictions for reducing the temperature of said fluid, an adjustable tapered plug for said low-temperature constriction, a thermal element connected to adjust said plug to maintain substantially constant the ratio of the temperature thereat to the square of the effective area of the associated constriction, a valve in said conduit, differential-pressure-responsive means connected across one of said constrictions and connected directly to said valve to maintain the differential pressure across said one of said constrictions substantially constant, and means responsive to the differential fluid pressure across the other of said constrictions for deriving an effect representative of a temperature factor of the contained fluid.

8. A pneumatic apparatus responsive to a temperature factor of an elastic fluid in a container comprising, a conduit adapted for fluid connection with the container, a metering first constriction in said conduit, a controlling second constriction in said conduit, heat-exchanging means between said constrictions for modifying the temperature of said fluid, a valve in said conduit, differential-pressure-responsive means connected across said second constriction and connected directly to said valve to maintain the differential pressure across said second constriction substantially constant, and a differential-pressure gauge connected across said first constriction and calibrated in terms of temperature.

9. A pneumatic apparatus responsive to a temperature factor of a high-temperature elastic fluid in a container comprising, a conduit adapted for fluid connection with the container, a high-temperature constriction in said conduit adjacent the end thereof adapted for connection to the container, a low-temperature constriction in said conduit remote from said high-temperature constriction, cooling means between said constrictions for reducing the temperature of said fluid, a valve in said conduit, differential-pressure-responsive means connected across said low-temperature constriction and connected directly to said valve to maintain the differential pressure across said low-temperature constriction substantially constant, and means responsive to the differential fluid pressure across said high-temperature constriction for deriving an effect representative of a temperature factor of the contained fluid.

10. A pneumatic apparatus responsive to a temperature factor of a high-temperature elastic fluid in a container comprising, a conduit adapted for fluid connection with the container, a high-temperature constriction in said conduit adjacent the end thereof adapted for connection to the container, a low-temperature constriction in said conduit remote from the container, cooling means between said constrictions for reducing the temperature of said fluid, a valve in said conduit, differential-pressure-responsive means connected across said high-temperature constriction and connected directly to said valve to maintain the differential pressure across said high-temperature constriction substantially constant, and means responsive to the differential fluid pressure across said low-temperature constriction for deriving an effect representative of a temperature factor of the contained fluid.

11. A pneumatic apparatus responsive to a temperature factor of an elastic fluid in a container comprising, a conduit adapted for fluid connection with the container, a metering first constriction in said conduit, a controlling second constriction in said conduit, means for inducing the flow of elastic fluid through said conduit to maintain substantial differential pressures across said constrictions, heat-exchanging means between said constrictions for modifying the temperature of said fluid, a valve in said conduit, differential-pressure-responsive means connected across said second constriction and connected directly to said valve to maintain the differential pressure across said second constriction substantially constant, and means responsive to the differential fluid pressure across said first constriction for deriving an effect representative of a temperature factor of the contained fluid.

12. A pneumatic apparatus responsive to a temperature factor of an elastic fluid in a container comprising, a conduit adapted for fluid connection with the container, a metering first constriction in said conduit, a controlling second constriction in said conduit, means for extracting fluid through said conduit to maintain differential pressures across said constrictions having an aggregate value exceeding the static pressure in the container, heat-exchanging means between said constrictions for modifying the temperature of said fluid, a valve in said conduit, differential-pressure-responsive means connected across said second constriction and connected directly to said valve to maintain the differential pressure across said second constriction substantially constant, and means responsive to the differential fluid pressure across said first constriction for deriving an effect representative of a temperature factor of the contained fluid.

13. A pneumatic apparatus responsive to a temperature factor of an elastic fluid in a container comprising, a conduit adapted for fluid connection with the container, a metering first constriction in said conduit, a controlling second constriction in said conduit, means for forcing air through said conduit into said container to maintain substantial differential pressures across said constrictions, heat-exchanging means connected to said conduit and adapted to be disposed in the container for changing the temperature of the conduit air substantially to that of the fluid in the container, a valve in said conduit, differential-pressure-responsive means connected across said second constriction and connected directly to said valve to maintain the differential pressure across said second constriction substantially constant, and means responsive to the differential fluid pressure across said first constriction for deriving an effect representative of a temperature factor of the contained fluid.

DAVID W. MOORE, JR.
ALFRED G. NASH.

REFERENCES CITED

The following references are of record in the file of this patent:

UNITED STATES PATENTS

| Number | Name | Date |
|---|---|---|
| Re. 11,413 | Uehling et al. | Apr. 17, 1894 |
| 554,323 | Uehling et al. | Feb. 11, 1896 |
| 773,684 | Speller | Nov. 1, 1904 |
| 1,630,307 | Norwood et al. | May 31, 1927 |
| 2,258,878 | Bassler | Oct. 14, 1941 |
| 2,468,416 | Stresen-Reuter | Apr. 26, 1949 |

FOREIGN PATENTS

| Number | Country | Date |
|---|---|---|
| 237,827 | Great Britain | Aug. 6, 1925 |